United States Patent
Thompson

(10) Patent No.: US 7,125,075 B2
(45) Date of Patent: Oct. 24, 2006

(54) NOISE SUPPRESSING BACKREST FOR HUNTERS

(75) Inventor: Craig S. Thompson, Plymouth, MN (US)

(73) Assignee: Sportsmen Innovations LLC, St. Baraboo, WI (US)

( * ) Notice: Subject to any disclaimer, the term of this patent is extended or adjusted under 35 U.S.C. 154(b) by 29 days.

(21) Appl. No.: 10/959,879

(22) Filed: Oct. 7, 2004

(65) Prior Publication Data
US 2006/0076811 A1    Apr. 13, 2006

(51) Int. Cl.
A47C 7/02    (2006.01)
A47C 31/00   (2006.01)
E04G 3/00    (2006.01)

(52) U.S. Cl. .................. 297/230.1; 182/187; 297/219.1
(58) Field of Classification Search ............. 297/230.1, 297/219.1, 228.12, 229; 182/187, 188, 135, 182/136, 20, 116; 248/218.4, 219.3, 219.4
See application file for complete search history.

(56) References Cited

U.S. PATENT DOCUMENTS

| | | | | |
|---|---|---|---|---|
| 4,148,376 A | * | 4/1979 | Campbell, Jr. ................ | 182/20 |
| 4,735,423 A | * | 4/1988 | Foss .............................. | 280/18 |
| 5,003,634 A | * | 4/1991 | Brinkman ........................ | 2/46 |
| 5,110,219 A | * | 5/1992 | Lopes ............................ | 383/4 |
| 5,454,623 A | * | 10/1995 | Parks ....................... | 297/230.1 |
| 5,524,956 A | * | 6/1996 | Moore ............................ | 297/4 |
| 5,782,531 A | * | 7/1998 | Shindle .................... | 297/230.1 |
| 6,065,722 A | * | 5/2000 | LeVasseur et al. ........ | 248/230.8 |
| 6,129,452 A | * | 10/2000 | Hakulin .......................... | 383/4 |
| 6,298,944 B1 | * | 10/2001 | Forbes et al. .................. | 182/3 |
| 6,508,446 B1 | * | 1/2003 | Addison et al. .......... | 248/218.4 |
| 6,581,891 B1 | * | 6/2003 | Byrd ........................ | 248/219.4 |
| 6,616,225 B1 | * | 9/2003 | Graff .......................... | 297/229 |
| 6,626,491 B1 | * | 9/2003 | Blome et al. ............... | 297/229 |
| 6,652,027 B1 | * | 11/2003 | Pardonnet .............. | 297/230.12 |
| 6,783,175 B1 | * | 8/2004 | Henderson ....................... | 297/4 |

* cited by examiner

Primary Examiner—Peter M. Cuomo
Assistant Examiner—Sarah B. McPartlin
(74) Attorney, Agent, or Firm—James V. Harmon

(57) ABSTRACT

A sound-suppressing hunter's backrest is formed from a supple layer of cloth or other sound-suppressing material in sheet form that is supported against a tree or other backing during use by straps or cords, but can also be rolled or folded into a compact bundle for storage and carried on the waist as a fanny pack. The backrest includes a pocket located proximate one end of the backrest that has a lip or edge which defines a pocket opening that extends between two opposed edges of the backrest and the pocket opening is positioned to face an opposite end of the sheet material so that continued rolling up of the sheet material will cause it to enter the pocket through the opening for storage. The straps or cords serve to attach the sheet material to a tree or other backing and one strap or cord also serves as a waist strap. A carabineer ring is connected to one of the straps with a portion extending through an opening in the backrest for being fastened to a harness that is worn by the hunter to prevent the hunter from falling, e.g., from an elevated tree stand.

12 Claims, 5 Drawing Sheets

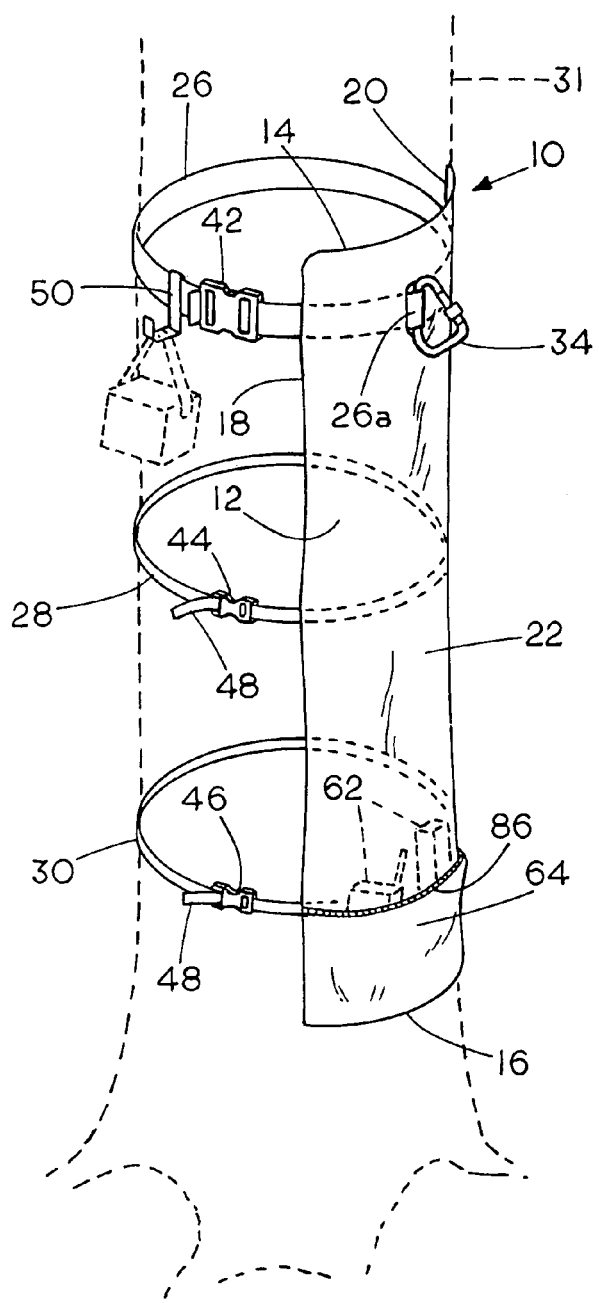

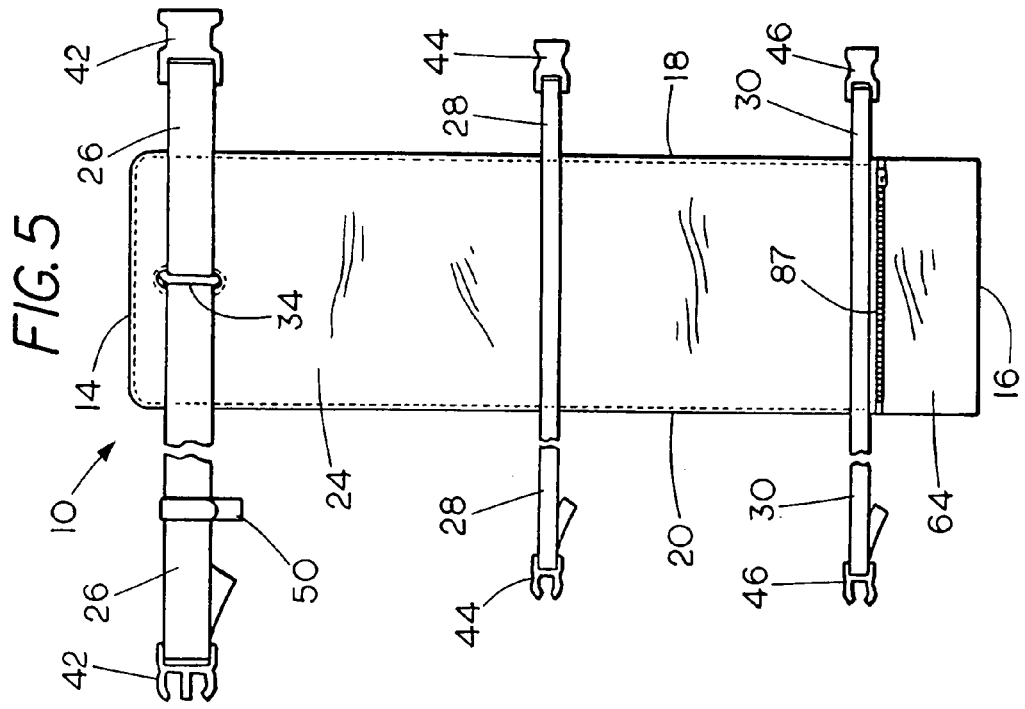
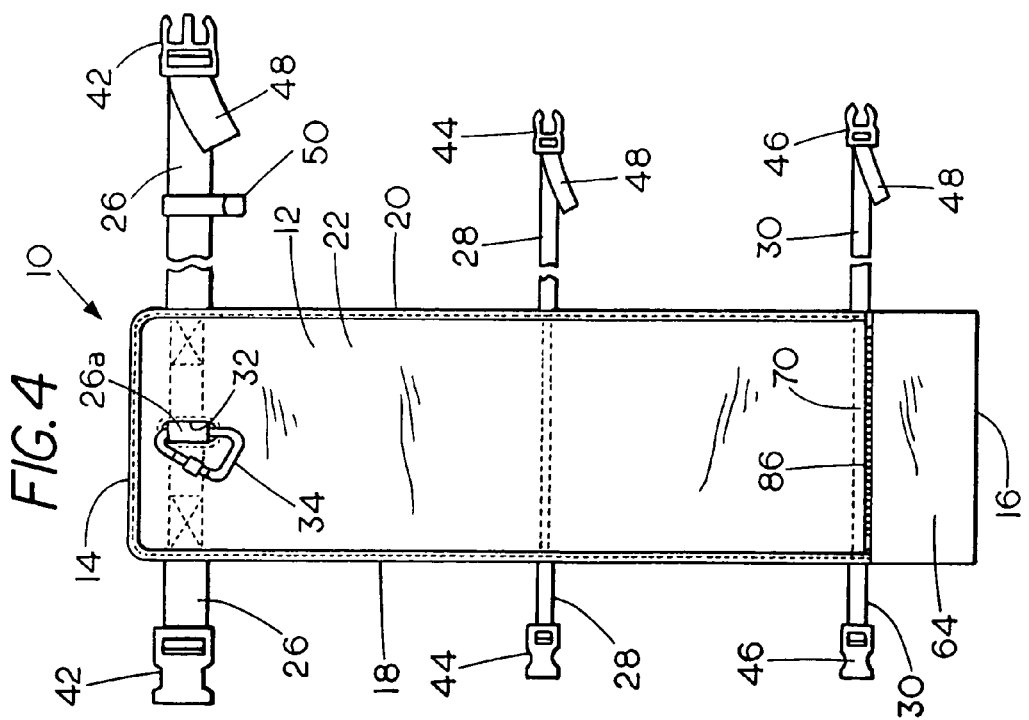

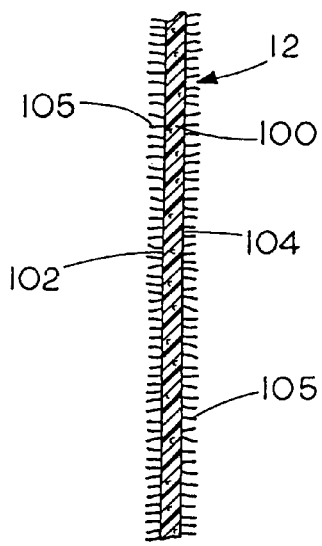
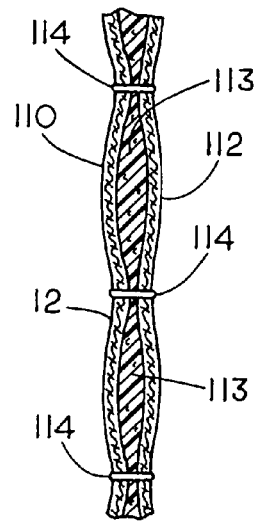
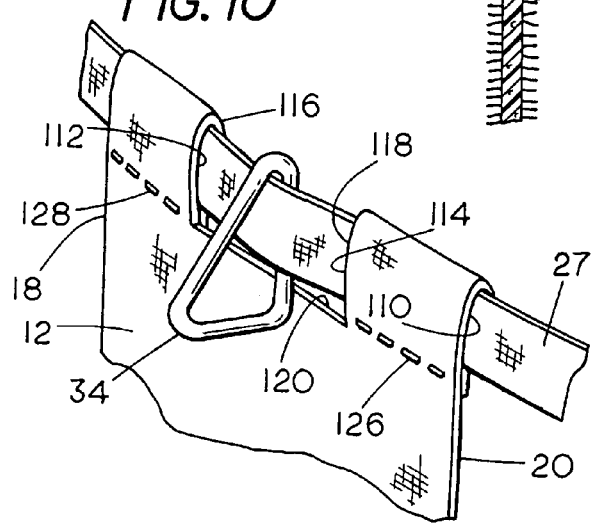
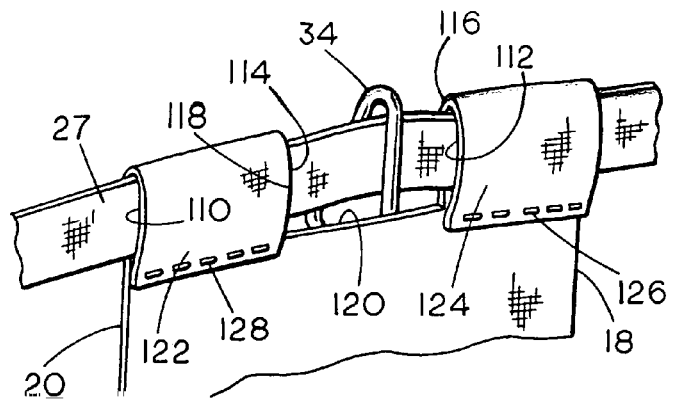

NOISE SUPPRESSING BACKREST FOR HUNTERS

FIELD OF THE INVENTION

This invention relates to hunting equipment and more particularly to a hunter's backrest.

BACKGROUND OF THE INVENTION

While several backrest devices have been previously proposed for hunters, game can easily be "spooked," i.e., alerted to the presence of the hunter if a sound is produced when the hunter contacts the tree bark or other backrest or the backrest itself moves slightly against the tree or other support to which it is connected. U.S. Pat. No. 6,652,027, for example, describes a padded backrest that has a rigid backing which because of its hard rear surface can rub against the tree and cause a sound if the backrest is moved slightly by the hunter as he aims. Moreover, because of its rigid structure, the patented backrest cannot be folded into a compact bundle. U.S. Pat. No. 5,782,531 describes a compact backrest, but there is no provision for enclosing the backrest when the backrest is not in use. Although the patented backrest includes a quiver, the quiver has a narrow opening that faces an adjacent side edge of the backrest that renders it only useful for carrying arrows. There is no way to enclose the backrest for storage.

U.S. Pat. No. 5,524,956 describes another backrest and seat which comprises three padded cushions that can be folded relative to one another along two horizontal lines and has an outer skin made of waterproof nylon and interior chambers filled with fiber material such as nylon fiber or styrofoam. While there are sleeves for a hand warmer, there is no way to enclose the backrest for storage when not in use and the relatively thick cushions that are filled with nylon fiber or styrofoam prevent the backrest from being rolled up. Each of the padded sections itself is resistant to folding so that the entire backrest is not able to be compacted into a small bundle. Moreover, none of the patented devices have a provision for supporting the hunter so as to prevent him from falling, e.g.; from a tree stand that may be suspended 10 or 15 feet in the air.

In view of these and other deficiencies of the prior art, it is one object of the present invention to provide an improved noise-suppressing backrest that can be rolled or folded into a compact bundle and is constructed so that continued rolling up of the material from which the backrest is formed will facilitate storage thereof.

Another object is to provide a noise-suppressing backrest of supple material having sound-suppressing qualities with a built-in feature having a closure as a part of the backrest to contain the backrest as a compact bundle.

A further object of the invention is the provision of a noise-suppressing backrest having a means to support the backrest as well as the hunter to prevent the hunter from falling, for example, when the backrest is used in a tree stand.

Yet another object of the invention is the provision of a sound-suppressing backrest with a self-contained feature for holding the backrest when rolled or folded into a bundle and including a dual-purpose element for attaching the backrest to a tree during use as well as to the hunter when the backrest is being carried.

These and other more detailed and specific objects of the present invention will be better understood by reference to the following figures and detailed description which illustrate by way of example but a few of the various forms of the invention within the scope of the appended claims.

SUMMARY OF THE INVENTION

The invention provides a sound-suppressing hunter's backrest formed from a supple layer of sound-suppressing material in sheet form such as fleece cloth that can be placed against a tree or other backing and can also be rolled or folded into a compact bundle for storage and in a preferred form can be carried on the waist as a fanny pack. The layer of soft material which forms the body of the backrest includes an enclosure in the form of a pocket located proximate one end of the backrest. The pocket has a lip or free edge which defines a pocket opening that extends between two opposed edges of the backrest. The pocket opening faces an opposite end of the sheet material whereby the sheet material can be folded or rolled up and the backrest is constructed such that continued rolling up of the material will cause it to enter the pocket through the pocket opening. A means such as straps or cords is provided for attaching the sheet material to a tree or other backing. One of the straps or cords is positioned adjacent to the pocket to serve a second function by supporting the backrest on the waist of the hunter when it is being carried. A connector such as a carabineer ring, a portion of which extends through the backrest, is preferably connected to one of the straps for being fastened to a safety harness that is worn by the hunter to prevent the hunter from falling when hunting from an elevated stand.

BRIEF DESCRIPTION OF THE DRAWINGS

FIG. 2 is a perspective view showing the invention in use while supported closer to the base of the tree.

FIG. 3 is a partial perspective view on a larger scale showing hooks that are used to support hunting accessories.

FIG. 4 is a front elevational view of the invention.

FIG. 5 is a rear elevational view of the invention.

FIG. 8 is a magnified vertical cross-sectional view of a portion of the body of the backrest taken on line 8—8 of FIG. 6.

FIG. 9 is a magnified vertical cross-sectional view of an optional form of composite material from which the backrest can be formed.

FIG. 10 is a front perspective view of a modified form of hunter support.

FIG. 11 is a rear perspective view of the embodiment of FIG. 10.

DESCRIPTION OF THE PREFERRED EMBODIMENTS

Figure 1:
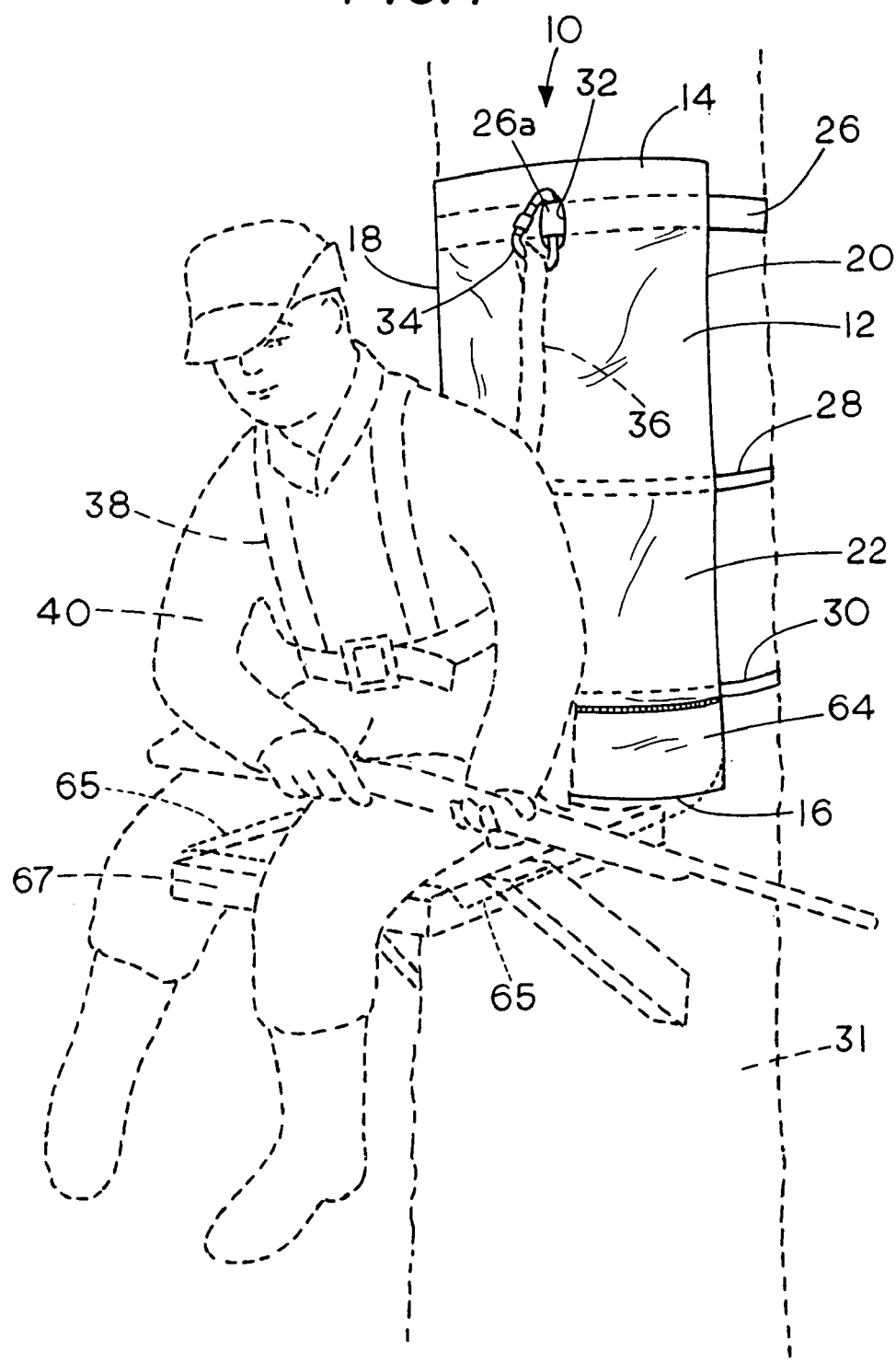
FIG. 1 is a perspective view showing the invention in use by a hunter in a tree stand waiting for game.

As shown in FIGS. 1, 2, 4 and 5, the invention provides a noise-suppressing backrest 10 comprising a supple layer of sound-suppressing material 12 in sheet form having a top 14, bottom 16, and a pair of laterally spaced apart side edges 18 and 20. The sound-suppressing sheet of material 12 is specially chosen to have sound-abating characteristics by being composed of a soft, supple material such as cloth, especially fleece cloth or any of several other sound-abating materials to be described in more detail below. The invention thus helps to assure little, if any, noise will result when the hunter moves. The backrest includes a front surface 22 (FIGS. 1, 2 and 4) and a rear surface 24 (FIG. 5) to which are secured three laterally extending, vertically spaced apart elongated connecting elements such as cords or straps 26, 28 and 30. It will be noticed that the top strap 26 is of a heavier and stronger construction than the other straps and is aligned proximate an opening 32 near the top edge 14 of the sheet material 12. A small portion 26a of the strap 26 can extend slightly through the opening 32 and is encircled by a connector comprising a ring 34, e.g. a steel ring, of any suitable known construction. In a preferred form, the ring 34 is a carabineer ring that meets the established performance standards for mountain climbing. During use, the carabineer ring 34 is secured to a stout tether 36 which is part of a harness 38 that which forms no part of the present invention and is worn by the hunter 40 especially when the invention is used in a tree stand elevated above the ground. The cords or straps 26–30 are provided with cooperating fasteners at each end indicated at 42, 44 and 46 that preferably have male and female parts of any suitable known construction as well as openings or slots through which the end portions 48 of each strap can be pulled for tightening each strap on the tree or other fixed backing. The term "strap" herein is used broadly to include any narrow, elongated flexible connection element.

Hunters accessories such as cameras, knives, food and other supplies are supported upon hooks 50 and 52 that can be formed from metal and include J-shaped, upwardly extending hooked ends 54 and 56 (FIG. 3) and downwardly opening slots 58 and 60 that can be slid downwardly to provide a tight frictional fit over the top of the strap 26 or one of the other straps. As shown in FIG. 2, other hunters' supplies 62 can be held in a pocket 64 at the bottom end of the sheet material 12 when the backrest is in use. In the embodiment shown, the entire body of sheet material 12 from which the backrest is formed is placed in a vertical position against the tree 31. If desired however, in an optional form of the invention, the lower portion of the sheet material 12 from which the backrest is formed, is made long enough to extend forwardly as shown at 65 in FIG. 1 over the seat 67 on which the hunter 40 is sitting to provide additional comfort and thermal insulation for the hunter while sitting in the tree stand, bench or any other seat. Because of the soft, sound-deadening qualities of the sheet material 12, the portion 65 beneath the hunter will also suppress noise that could be produced when the hunter moves so as to avoid alerting the game. The invention can be mounted high in a tree as in FIG. 1 or close to the ground, if desired, as in FIG. 2 and can be used for other purposes, e.g., as a tarpauline or ground cloth.

Figure 6:
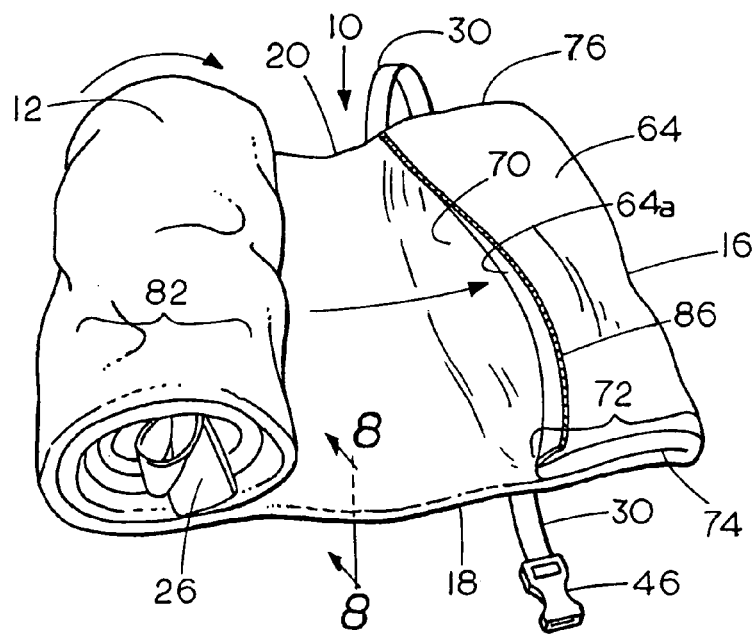
FIG. 6 is a perspective view of the invention as it is being rolled into a compact bundle for storage.
Figure 7:
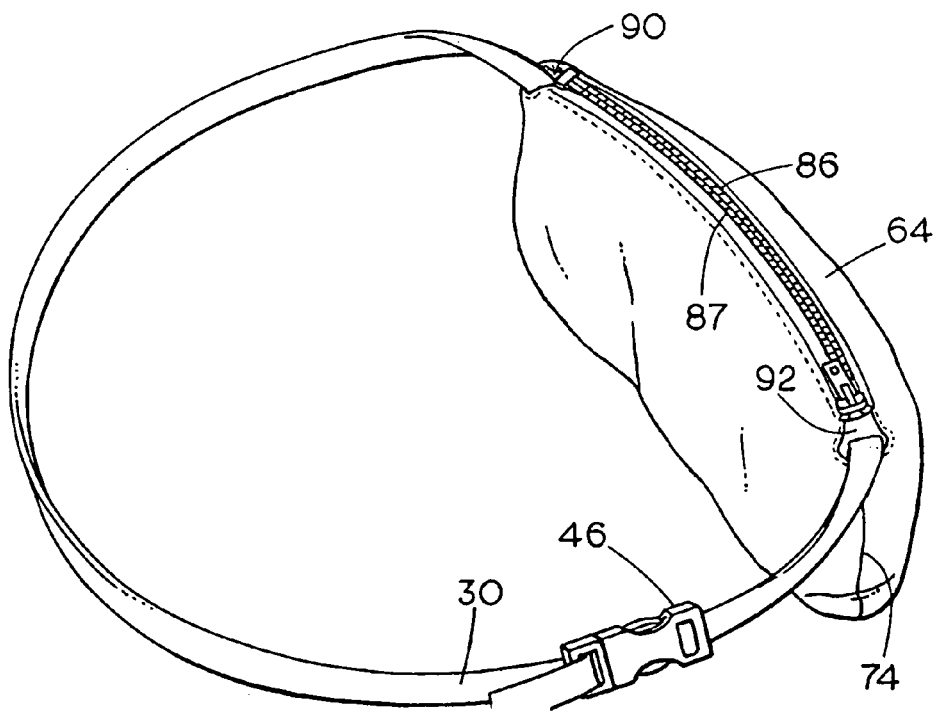
FIG. 7 is a perspective view of the invention as it appears during storage as a pack that can be carried around the waist of the hunter.

Refer now to FIG. 6 which illustrates how the invention can be stored. As shown in the Figure, the soft, supple and flexible character of the sound-suppressing sheet material 12 enables it to be folded or rolled from left to right in the Figure so that a continued rolling up of the material 12 will cause the sheet material 12 which forms the body of the backrest 10 to enter the pocket 64 through a pocket opening 70. The pocket 64 is preferably formed from the same material 12 of which the body of the backrest is composed and most preferably comprises an end portion 72 of the flexible sheet material 12 which is folded back upon itself and secured by sewing along laterally spaced apart edges at 74 and 76 to define the pocket opening or mouth 70 which, as can be seen in FIG. 6, extends substantially all the way from one side edge 18 to an opposite side edge 20. The pocket 64 is positioned proximate the bottom end 16 of the backrest 10 with the pocket opening 70 facing the opposite, i.e., top end 14 of the backrest. It can thus be seen that it is the orientation of the pocket opening 70 and the extension of the pocket opening 70 from one side edge 18 to an opposite side edge 20 that enables the bundle of material 82 to enter the pocket opening 70 as it is rolled up. The free edge or lip of the pocket 64 is designated 64a. Along the edge 64a of the pocket is sewn one half 86 of a complete closure such as a zipper. The other half 87 of the zipper is sewn to the rear surface 24 of the backrest as shown in FIG. 5 proximate the pocket 64 so that when the bundle 82 of sheet material 12 is compacted and enclosed within the pocket 64 as shown in FIG. 7, the two halves 86 and 87 of the complete zipper are aligned in cooperating position confronting one another allowing the complete zipper to be zipped shut as shown in FIG. 7 to enclose the backrest when not in use. If desired, the zipper 86, 87 can be replaced by other forms of closures such as snaps, buttons, Velcro® or hook and loop fasteners. The location of the strap on sheet material 12 is selected so that when stored the strap 30 is partially enclosed within the pocket 64 and extends outwardly at each end through openings 90 and 92 so that it can be placed around the waist of the hunter to support the enclosed backrest when carried to and from the location where it is to be used.

Preferred compositions of the sheet material from which the backrest is formed will be described with reference to FIGS. 8 and 9. One preferred sound-suppressing sheet material 12 is shown in FIG. 8. In this case, the sheet material comprises a single layer of soft and supple woven fabric, e.g., a fleece cloth having a loosely woven center portion 100 comprising woven threads, or if desired of plastic foam, which is slightly elastic enabling it to spring back when compressed between the fingers and having front and rear surfaces 102 and 104. Extending outwardly from the surfaces 102 and 104 are nap fibers 105 that are uniformly almost perpendicular to the surfaces 102, 104. The fleece fabric 12 thus provides softness and a cushioning function as well as a sound-suppressing function. It was found, for example, that when canvas or other relatively stiff fabric is placed against a tree or other backing, it is possible for it to rub against the tree bark when the hunter moves or for the hunter's body to produce a sound when moving against the rough or stiff surface of the canvas or other material. However, when a supple, sound-suppressing flexible sheet is used in accordance with the present invention, virtually no detectable sound is produced, either between the hunter and the sheet material 12 or by the material 12 rubbing against the tree bark. Consequently, the hunter can move to make observations or aim without danger of alerting and hence scaring away the game. The invention does not eliminate all sound. A sound-suppressing material herein is one that will substantially reduce the sound that would otherwise be produced by a person rubbing against the bark of a tree.

Refer now to FIG. 9 which shows another alternate form of the invention. In this case, the flexible sound-suppressing material 12 comprises a sandwich structure or laminate composed of a pair of layers of sound-suppressing cloth 110 and 112 between which is sandwiched a thin layer 113 of sound-suppressing material such as fluffy cloth or a sheet of flexible foamed plastic, e.g., Volara® typically about ⅛" in thickness. The sandwich structure can be unified by spaced apart rows of stitches 114.

FIGS. 10 and 11 illustrate an alternate form of the invention in which the hunter supplies his own safety strap 27. In this form, the hunter's safety strap 27 is placed through two passages 110 and 112 separated by an opening 114 having parallel edges 116 and 118 and lower edge 120 defining two flaps 122 and 124 which form the passages 110 and 112. Flaps 122 and 124 are fastened to the back of the material 12 by sewing at 126 and 128. The carabineer 34 is placed around strap 27 within opening 114.

The sound-suppressing layer 12 comprising the body of the backrest can be formed from a variety of sound-suppressing materials such as one or more layers of cloth, e.g., fleece cloth or flannel as shown in FIG. 8 or of other material such as non-woven fabric, soft leather, e.g., chamois skin or buckskin of the kind used to make shirts or of suede leather. Other materials include sheepskin with or without fur on one side, felt, or foamed plastic sheet material, such as flexible foam polyurethane sheeting, copolyester foam sheeting or foam polyethylene sheet material such as that sold commercially under the trademark Volara®. Other supple sound-suppressing sheet materials that can be used will be apparent to those skilled in the art once the principles described herein are understood. The sheet material 12 is preferably provided with camouflage coloration to blend in with surrounding vegetation.

Many variations of the invention within the scope of the appended claims will be apparent to those skilled in the art once the principles described herein are read and understood.

What is claimed is:

1. A noise suppressing backrest for hunters comprising,
a supple layer of sound-suppressing material in sheet form adapted to be placed against a tree or other backing and rolled or folded into a bundle for storage, said layer having a top and bottom and a pair of laterally spaced apart side edges,
a plurality of vertically spaced apart laterally extending backrest supporting straps secured to the layer of material for attaching the sheet material to the tree or other backing to provide a silencing backrest for the hunter such that contact by the hunter against the layer of material or contact between the backrest and the backing will be less likely to alert game to the presence of the hunter,
one of the straps is of sufficient length to extend around said tree,
a separate connector element is secured to said one strap intermediate the ends thereof,
the connector is located between the side edges of the material for being fastened to a safety harness that is worn by the hunter such that the hunter is prevented from falling by the presence of an attachment between the backrest and the backing,
the layer of material has a pocket with a laterally extending free edge defining a pocket opening,
one half of a closure is secured to the free edge of the pocket so as to extend laterally on the layer of material,
a second half of said closure is provided on an opposite surface of the backrest such that the backrest can be folded or rolled into a compact bundle and inserted into the pocket for storage and the halves of the closure then become aligned confronting one another for allowing the closure to be fastened shut with the bundle enclosed within the pocket.

2. The noise suppressing backrest of claim 1 wherein the straps are connected to a back surface of the layer of material such that the hunter does not contact the strap material when the hunter rests against said layer of material.

3. The noise suppressing backrest of claim I wherein the layer of material has an opening aligned with a strap such that a strap extends proximate the opening and the connector is secured to a portion of said strap proximate the opening so as to be positioned at least partially on a front side of the layer of material opposite the backing to enable the connector and a strap to be secured to the harness worn by the hunter.

4. The backrest of claim 1 wherein the closure is a zipper and at least one of the straps is secured adjacent to the zipper in a location adapted to extend through the pocket when the zipper is zipped shut.

5. The combination of claim 1 and at least one hook member connected thereto for supporting a hunting accessory that is to be used by the hunter.

6. The combination of claim 5 wherein the hook is connected to one of the straps.

7. The backrest of claim 1 wherein the pocket is formed from sound-suppressing material and a waist strap is connected to the backrest in a position to project from the backrest for fastening the backrest to the waist of the hunter when the backrest is enclosed in the pocket.

8. The backrest of claim 1 wherein the layer of material is formed from a fleece fabric.

9. The backrest of claim 1 wherein the pocket and the layer of material are both formed from the same piece of fleece fabric and the pocket comprises a portion of the layer of material at one end thereof, said portion being folded adjacent thereto and secured to the material along laterally spaced apart side edges thereof to define said packer.

10. The backrest of claim 1 wherein the sheet material is selected from the group consisting of fleece, leather, foamed plastic sheet material, non-woven fabric, felt and a laminate composed of at least two layers.

11. The backrest of claim 1 wherein the pocket extends substantially across the entire backrest and has a pocket opening that faces an end of the backrest opposite said pocket.

12. The backrest of claim 1 wherein the backrest includes a passage for said one strap which comprises a hunter's safety strap and the hunter's safety strap is placed to extend through the passage for connecting the hunter's strap to the backrest.

* * * * *